(12) United States Patent
Dorenkamp et al.

(10) Patent No.: US 10,777,087 B2
(45) Date of Patent: Sep. 15, 2020

(54) AUGMENTED REALITY FOR REMOVING EXTERNAL STIMULI

(71) Applicant: INTERNATIONAL BUSINESS MACHINES CORPORATION, Armonk, NY (US)

(72) Inventors: Austin Dorenkamp, Rochester, MN (US); Paul Gerver, Rochester, MN (US); Jonathan Fouk, Rochester, MN (US); Nicholas Roessler, Waunakee, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/213,650

(22) Filed: Dec. 7, 2018

(65) Prior Publication Data

US 2020/0184839 A1      Jun. 11, 2020

(51) Int. Cl.
*G09B 5/12*      (2006.01)
*G02B 27/01*      (2006.01)
*G06T 19/00*      (2011.01)

(52) U.S. Cl.
CPC .............. *G09B 5/12* (2013.01); *G02B 27/017* (2013.01); *G06T 19/006* (2013.01)

(58) Field of Classification Search
CPC combination set(s) only.
See application file for complete search history.

(56) References Cited

U.S. PATENT DOCUMENTS

| 6,621,524 | B1 * | 9/2003 | Iijima | H04N 5/262 348/584 |
| 8,558,759 | B1 * | 10/2013 | Prada Gomez | G06F 3/017 345/156 |
| 8,847,850 | B1 * | 9/2014 | Cho | G02B 27/017 345/7 |
| 9,317,713 | B2 * | 4/2016 | Wong | G06F 21/6245 |
| 9,395,812 | B2 * | 7/2016 | Schmidt | G06F 3/011 |
| D765,658 | S |  9/2016 | Spio | |
| 10,262,630 | B2 * | 4/2019 | Taki | G06F 3/048 |

(Continued)

OTHER PUBLICATIONS

Schmalstieg et al., The Studierstube Augmented Reality Project, pp. 33-54, 2002 Massachusetts Institute of Technology, vol. 11, No. 1 (Year: 2002).*

(Continued)

*Primary Examiner* — Motilewa Good Johnson
(74) *Attorney, Agent, or Firm* — Kunzler Bean & Adamson; Bruce R. Needham

(57) ABSTRACT

Apparatuses, systems and computer-implemented methods are disclosed for augmented reality stimulus removal. A field definition module determines a permitted field of view for a user. A field recognition module identifies a portion of an image stream outside the permitted field of view. The image stream is obtained by an augmented reality device of the user. An overlay module modifies the image stream for display to the user via the augmented reality device. The overlay module modifies the image stream by obscuring the portion of the image stream outside the permitted field of view in response to a restrictive mode being set for the user.

20 Claims, 7 Drawing Sheets

(56) References Cited

U.S. PATENT DOCUMENTS

| | | | |
|---|---|---|---|
| 2007/0248261 A1* | 10/2007 | Zhou | G16H 30/40 |
| | | | 382/154 |
| 2009/0141895 A1* | 6/2009 | Anderson | G06F 21/84 |
| | | | 380/252 |
| 2011/0148935 A1* | 6/2011 | Arrasvuori | G06F 1/1626 |
| | | | 345/676 |
| 2013/0084012 A1* | 4/2013 | Murphy | G06T 19/006 |
| | | | 382/190 |
| 2013/0189658 A1 | 7/2013 | Peters et al. | |
| 2014/0055451 A1 | 2/2014 | Keating et al. | |
| 2015/0123966 A1* | 5/2015 | Newman | G06T 19/006 |
| | | | 345/419 |
| 2016/0274365 A1* | 9/2016 | Bailey | G09G 3/02 |
| 2016/0337599 A1* | 11/2016 | Williams | H04W 64/00 |
| 2017/0039869 A1 | 2/2017 | Gleim et al. | |
| 2017/0162177 A1* | 6/2017 | Lebeck | G06F 21/6218 |
| 2017/0263142 A1 | 9/2017 | Zereshkian et al. | |
| 2017/0336641 A1* | 11/2017 | von und zu Liechtenstein | |
| | | | G06F 3/147 |
| 2017/0337352 A1* | 11/2017 | Williams | G06T 19/006 |
| 2018/0077451 A1* | 3/2018 | Yip | H04N 13/111 |
| 2018/0089972 A1* | 3/2018 | Gabel | H04N 5/265 |
| 2019/0266256 A1* | 8/2019 | Dudani | G06F 16/93 |
| 2019/0394387 A1* | 12/2019 | Wood | H04B 10/116 |

OTHER PUBLICATIONS

Szalarvari et al., Collaborative Gaming in Augmented Reality, Institute Computer Graphics, pp. 195-204, VRST '98 Proceedings of the ACM Symposium on Virtual Reality Software and Technology, Nov. 2, 1998 (Year: 1998).*

Leticia Lafuente Lopez, Virtual Reality and Augmented Reality in Education, eLearning Industry, Mar. 24, 2016, pp. 1-19, https://elearningindustry.com/virtual-reality-augmented-reality-education.

* cited by examiner

US 10,777,087 B2

AUGMENTED REALITY FOR REMOVING EXTERNAL STIMULI

BACKGROUND

The subject matter disclosed herein relates to augmented reality devices and more particularly relates to augmented reality for removing external stimuli.

Tests may be administered for a variety of purposes, such as for admission into universities or particular programs of study, for evaluating student knowledge or performance, as a requirement for finishing a course or program, as a requirement for professional licensing, or the like. Administering a test in a room with multiple people taking the same test may allow a proctor to enforce test rules such as time limits, limits on what information the test takers can refer to, or the like. However, the proximity of test takers to each other may also facilitate cheating: a test taker may be able to quickly glance away from his or her own test and view another person's answers, without being noticed by the proctor. Test takers may also cheat by quickly referring to small or hidden notes or answers. Cheating by glancing at unauthorized information or other tests may decrease the fairness or effectiveness of a test, but may be difficult to detect. Additionally, in circumstances apart from test-taking, various stimuli external to the task at hand may cause a user to become distracted, lose focus, or the like

SUMMARY

Apparatuses are disclosed for augmented reality stimulus removal. Systems and computer-implemented methods also perform the functions of the apparatus. According to some embodiments of the present invention, an apparatus includes a field definition module, a field recognition module, and an overlay module. The field definition module determines a permitted field of view for a user. The field recognition module identifies a portion of an image stream outside the permitted field of view. The image stream is obtained by an augmented reality device of the user. The overlay module modifies the image stream for display to the user via the augmented reality device. The overlay module modifies the image stream by obscuring the portion of the image stream outside the permitted field of view in response to a restrictive mode being set for the user.

Systems are disclosed for augmented reality stimulus removal. In some embodiments, a system includes an augmented reality device for a user, a field definition module, a field recognition module, and an overlay module. The augmented reality device obtains an image stream and displays a modified image stream to the user. The field definition module determines a permitted field of view for the user. The field recognition module identifies a portion of the obtained image stream outside the permitted field of view. The overlay module produces the modified image stream by obscuring the portion of the obtained image stream outside the permitted field of view in response to a restrictive mode being set for the user.

Computer-implemented methods are disclosed for augmented reality stimulus removal. A computer implemented method, in some embodiments, includes determining a permitted field of view for a user and identifying a portion of an image stream outside the permitted field of view. The image stream is obtained by an augmented reality device of the user. The computer-implemented method includes modifying the image stream for display to the user via the augmented reality device, by obscuring the portion of the image stream outside the permitted field of view in response to a restrictive mode being set for the user.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
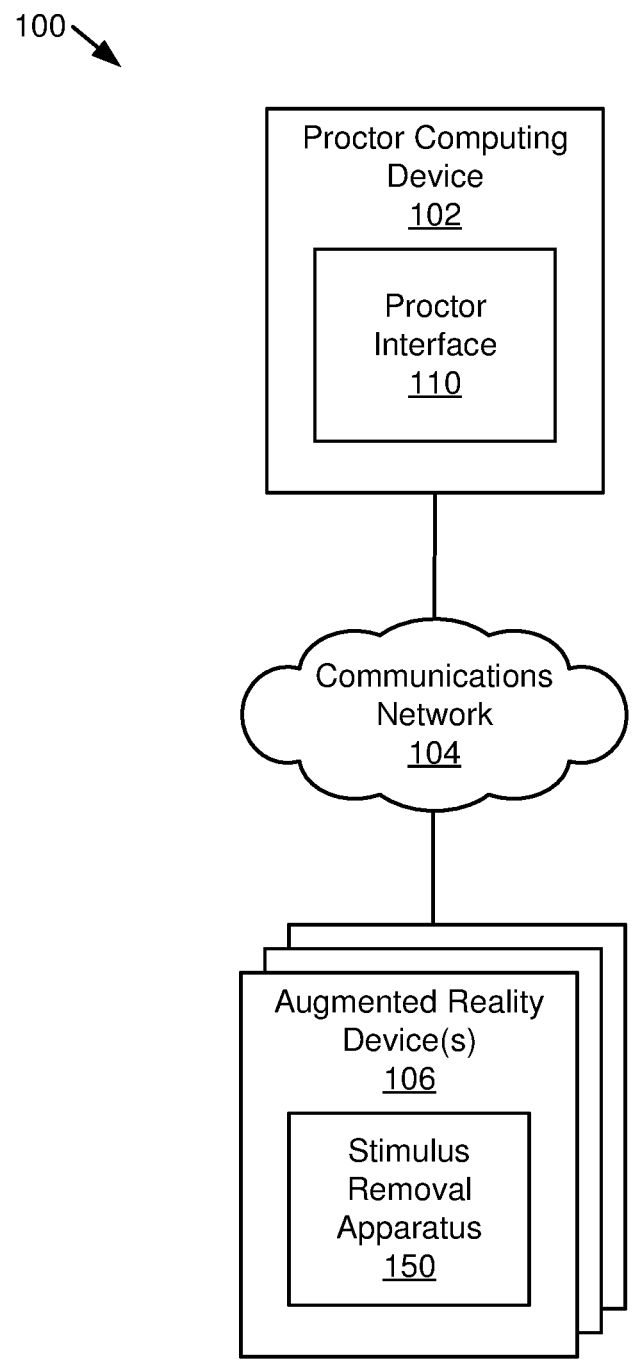
FIG. 1 is a schematic block diagram illustrating one embodiment of a system for augmented reality stimulus removal, in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Apparatuses are disclosed for augmented reality stimulus removal. In some embodiments, an apparatus includes a field definition module, a field recognition module, and an overlay module. The field definition module determines a permitted field of view for a user. The field recognition module identifies a portion of an image stream outside the permitted field of view. The image stream is obtained by an augmented reality device of the user. The overlay module modifies the image stream for display to the user via the augmented reality device. The overlay module modifies the image stream by obscuring the portion of the image stream outside the permitted field of view in response to a restrictive mode being set for the user.

In some embodiments, the apparatus includes a proctor interface module that communicates with a proctor via an interface. In other embodiments, the proctor interface module sets and unsets the restrictive mode based on the proctor operating the interface. In some embodiments, the proctor interface module presents an alert to the proctor in response to determining, based on a removal sensor for the augmented reality device, that the user has removed the augmented reality device.

In some embodiments, the permitted field of view is based on a permitted horizontal orientation range and/or a permitted vertical orientation range. In other embodiments, the permitted field of view is based on one or more permitted items including one or more physical items in a space where the user is located, an orientation of the user at a particular time. At least one boundary definition marker, and/or field definition information from a proctor.

In some embodiments, the field recognition module identifies the portion of the image stream outside the permitted field of view based on information from at least one sensor of the augmented reality device. In further embodiments, the at least one sensor includes a gyroscope and/or an accelerometer.

In some embodiments, the overlay module obscures the portion of the image stream outside the permitted field of view by replacing the portion with a solid color, a still image, and/or a transformed view of the portion. In other embodiments, the overlay module further modifies the image stream to display permitted information to the user. In further embodiments, the permitted information is electronically transmitted to the augmented reality device. In other embodiments, the permitted information excludes items visible in a space where the user is located.

In some embodiments, the user is a test taker and the overlay module further modifies the image stream to display at least one customized test question to the test taker. In other embodiments, the overlay module further modifies the image stream to indicate, over the obscured portion of the image stream outside the permitted field of view, a direction to the permitted field of view. In other embodiments, the overlay module outputs a full-view mode image stream for display to the user via the augmented reality device in response to a full-view mode being set for the user. In other embodiments, the portion of the image stream outside the permitted field of view is unobscured in the full-view mode.

Systems are disclosed for augmented reality stimulus removal. In some embodiments, a system includes an augmented reality device for a user, a field definition module, a field recognition module, and an overlay module. The augmented reality device obtains an image stream and displays a modified image stream to the user. The field definition module determines a permitted field of view for the user. The field recognition module identifies a portion of the obtained image stream outside the permitted field of view. The overlay module produces the modified image stream by obscuring the portion of the obtained image stream outside the permitted field of view in response to a restrictive mode being set for the user.

In some embodiments, a computing device presents an interface to a proctor. In further embodiments, a proctor interface module communicates with the proctor via the interface, and sets and unsets the restrictive mode based on the proctor operating the interface. In other embodiments, the augmented reality device includes a removal sensor. In further embodiments, the proctor interface module presents an alert to the proctor in response to determining, based on the removal sensor, that the user has removed the augmented reality device.

In some embodiments, the augmented reality device includes at least one sensor. In other embodiments, the at least one sensor includes a gyroscope and/or an accelerometer. In further embodiments, the field recognition module identifies the portion of the obtained image stream outside the permitted field of view based on information from the at least one sensor.

Computer-implemented methods are disclosed for augmented reality stimulus removal. A computer implemented method, in some embodiments, includes determining a permitted field of view for a user and identifying a portion of an image stream outside the permitted field of view. The image stream is obtained by an augmented reality device of the user. The computer-implemented method includes modifying the image stream for display to the user via the augmented reality device, by obscuring the portion of the image stream outside the permitted field of view in response to a restrictive mode being set for the user.

In some embodiments, the computer-implemented method includes communicating with a proctor via an interface, to set and unset the restrictive mode based on the proctor operating the interface. In other embodiments, the computer-implemented method includes presenting an alert to a proctor in response to determining, based on a removal sensor for the augmented reality device, that the user has removed the augmented reality device. In some embodiments, obscuring the portion of the image stream outside the permitted field of view includes replacing the portion with a solid color, a still image, and/or a transformed view of the portion.

FIG. 1 depicts one embodiment of a system 100 for augmented reality stimulus removal. In the depicted embodiment, the system 100 includes a proctor computing device 102, a proctor interface 110 operating on the proctor computing device 102, a communications network 104, one or more augmented reality devices 106, and one or more stimulus removal apparatuses 150 operating on the one or more augmented reality devices 106, which are described below.

In general, in various embodiments, an augmented reality device 106 may obtain an image stream and display a modified image stream to a user, such as a person taking a test. In some embodiments, an augmented reality device 106 obtains an image stream (e.g., a video feed or another stream of images) using a camera to capture what would be in the user's field of view in the absence of an augmented reality device 106, modifies the image stream to overlay information that augments the image stream (e.g., by providing additional information about what the user sees or by removing detail from the image stream), and displays the modified image stream in the user's field of view, so that the user experiences an "augmented" version of what he or she would normally see.

In some embodiments an augmented reality device 106 may be or may include a head-mounted device, with a display positioned in front of a user's eyes, so that the user's view of the physical world is replaced by a view of the display, showing the modified image stream. In some embodiments, an augmented reality device 106 may also be capable of functioning as a virtual reality device, to replace a user's view of the physical world with a view of a simulated "virtual" environment, but may function as an augmented reality device 106 when the modified image stream displayed to the user is at least partially based on the user's actual surroundings. In one example, the modified image stream includes unmodified portions of an image stream obtained from a camera, and modified portions, where the obtained image stream is overlaid with something other than what was in the obtained image stream. An overlay, in some embodiments, adds or removes information from the field of view. In one example, overlaid information includes prices or product details for items a user may wish to purchase, explanatory information for items a user may wish to understand further, or the like.

In some embodiments, an augmented reality device 106 is a device made primarily for use as an augmented reality device 106, a virtual reality device or the like. In other embodiments, an augmented reality device 106 is or includes a general-purpose device, or a device with uses outside the field of augmented and/or virtual reality. In some examples, a smartphone includes a camera and a display suitable for obtaining an image stream and displaying a modified image stream, and an augmented reality device 106 includes a user's smartphone, an application executing on or communicating with the phone to obtain and modify the image stream, and/or accessories such as a head mount to position the phone display appropriately within the user's field of view. One of skill in the art will recognize various types of augmented reality devices 106, and uses for them. Augmented reality devices 106 are described in further detail below with reference to FIG. 2.

In the depicted embodiment of a system 100 for augmented reality stimulus removal, one or more users have, or are provided with, augmented reality devices 106. A user includes any user of an augmented reality device 106, and may be a person taking a test or a person who wishes to remove or obscure external stimuli for reasons other than test-taking. One or more stimulus removal apparatuses 150 operate on or communicate with the augmented reality device(s) 106. In general, in various embodiments, a stimulus removal apparatus 150 determines a permitted field of view for a user and identifies a portion of an image stream obtained by the user's augmented reality device 106 as being outside the permitted field of view. In response to a restrictive mode being set, the stimulus removal apparatus 150 modifies the image stream for display to the user via the augmented reality device 106, by obscuring the portion of the image stream outside the permitted field of view.

In various embodiments, determining a permitted field of view for a user, and identifying and obscuring a portion of an image stream outside the permitted field of view, may avoid, reduce, or prevent cheating on a test by limiting the user's ability to see other people's tests outside the permitted field of view, "cheat sheets" outside the permitted field of view, or the like. In some examples, the permitted field of view includes the user's desk, so that the user can see his or her own test on the desk, but does not include desks of other users, a region between the desk and the user where a "cheat sheet" might be unobtrusively concealed, or the like. The stimulus removal apparatus 150 is described in further detail below with regard to the apparatuses 400, 500, of FIGS. 4 and 5.

In the depicted embodiment, a stimulus removal apparatus 150 operates on or is embodied by an augmented reality device 106. In some examples, in the depicted embodiment, the system 100 include a plurality of augmented reality devices 106, upon which a plurality of stimulus removal apparatuses 150 are operating. In another embodiment, a stimulus removal apparatus 150 operates on or is embodied by a combination of an augmented reality device 106 and another device, such as proctor computing device 102, a server, or the like. In some examples, a portion of a stimulus removal apparatus 150 that modifies an image stream for display to a user operates on the user's augmented reality device 106, and a portion of the stimulus removal apparatus 150 that communicates with a proctor operates on a proctor computing device 102.

In other embodiments, a stimulus removal apparatus 150 operates on or is embodied by a server (not shown in FIG. 1), and communicates with one or more augmented reality devices 106 and/or a proctor computing device 102 as clients. In other embodiments, a stimulus removal apparatus 150 operates on or is embodied by one or more computing devices outside a server/client architecture. One of skill in the art will recognize various other or further ways to implement a stimulus removal apparatus 150.

In various embodiments, one or more augmented reality devices 106 communicate with a proctor computing device 102, with a stimulus removal apparatus 150 operating on a server, or the like, via the communications network 104. In the depicted embodiment, the proctor computing device 102 communicates with the augmented reality devices 106 and the stimulus removal apparatuses 150 via the communications network 104 to allow a proctor to set or unset a limited-view restrictive mode for the users.

The communications network 104, in various embodiments, includes any network or collection of networks that may communicate with the augmented reality devices 106, the proctor computing device 102, and/or a stimulus removal apparatus 150 operating on another computing device. In some examples, the communications network 104 includes a local area network ("LAN"), a wired network, a wireless network, a mobile data network, the Internet, or the like. The communications network 104 includes one or more connections, switches, routers, data cables, transmitters, and the like normally associated with a communications network 104. In some embodiments, the communications network 104 includes multiple networks functioning to transmit information between a proctor computing device 102 and an augmented reality device 106, between a stimulus removal apparatus 150 operating on a server and an augmented reality device 106, or the like.

A proctor computing device 102, in various embodiments, includes a computing device owned, controlled, or used by a test proctor, such as a laptop computer, a tablet computer, a smartphone, a desktop computer, a smart watch, or the like. The proctor computing device 102, in various embodiments, presents an interface, such as the proctor interface 110, to a proctor. A proctor includes any person who monitors or supervises test takers during a test, or who controls a test-taking environment, enforces rules or regulations of a test, delivers instructions for taking a test, gathers completed test papers, or otherwise controls, supervises, or participates in the administration of a test. In some embodiments, a stimulus removal apparatus 150 is used to remove stimuli for reasons other than test-taking, and a proctor computing device 102 or proctor interface 110 are used by a person other than a test proctor to control a stimulus removal apparatus 150, set or unset a restrictive mode, or the like.

In the depicted embodiment, a proctor interface 110 operates on or is embodied by the proctor computing device 102. A proctor interface 110 includes any interface allowing a proctor to communicate with or control a stimulus removal apparatus 150, and may include a smartphone application for use by a proctor, a web-based interface, a graphical user interface, a text-based interface, or the like. The proctor computing device 102 presents the proctor interface 110 to the proctor by running an application, loading a web page, or the like, to display or otherwise present components of the proctor interface 110 that are operable by the proctor to communicate with or control a stimulus removal apparatus 150. One of skill in the art will recognize various other or further types of proctor interfaces 110 suitable for use by a proctor to communicate with or control a stimulus removal apparatus 150, and various other or further types of proctor computing device 102 suitable for presenting a proctor interface 110 to a proctor.

Figure 2:
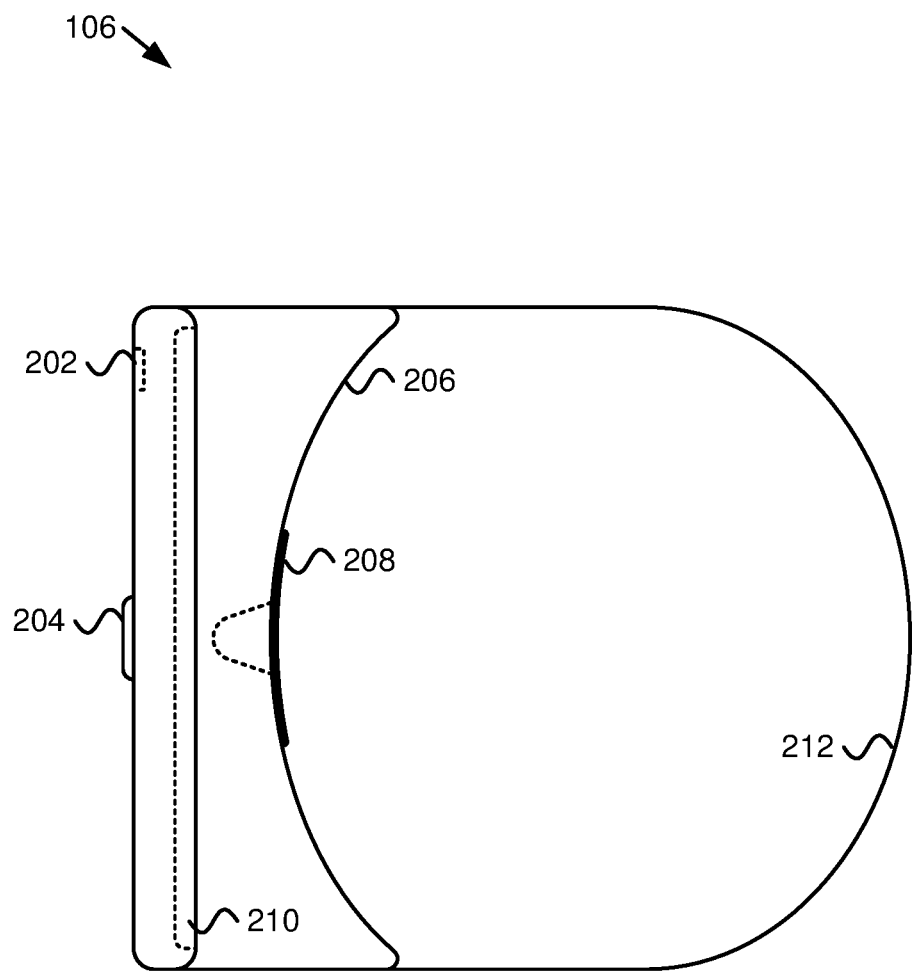
FIG. 2 is a top view illustrating one embodiment of an augmented reality device, in accordance with one embodiment of the present invention.

FIG. 2 depicts one embodiment of an augmented reality device 106, in a top view. The augmented reality device 106 may be substantially as described above with reference to the augmented reality device 106 of FIG. 1. In the depicted embodiment, the augmented reality device 106 includes at least one sensor 202, a camera 204, a face mask 206, a removal sensor 208, a display 210, and a head strap 212, which are described below.

The augmented reality device 106, in the depicted embodiment, uses a camera 204 to obtain an image stream. A camera 204, in various embodiments, is any device or component capable of obtaining an image stream or series of images, and may include one or more lenses, one or more image sensors, or the like. In certain embodiments, a camera 204 is a digital camera such as a camera with a complementary metal-oxide-semiconductor ("CMOS") image sensor, a camera with a charge-coupled device ("CCD") image sensor, a plurality of image sensors, or the like. In the depicted embodiment, the camera 204 is built in to the augmented reality device 106. In another embodiment, a camera 204 is a separate device coupled to the augmented reality device 106.

In various embodiments, a camera 204 captures images or image streams in digital formats for processing by a stimulus removal apparatus 150. Obtaining an image stream using a camera 204 includes using the camera 204 to capture images periodically or at intervals (e.g., at a video frame rate). The image stream may include raw images or video, images in a compressed image format, images in a compressed video format, or the like. One of skill in the art will recognize various other or further types of camera 204, types of image stream, and ways to use a camera 204 to obtain an image stream.

In the depicted embodiment, the augmented reality device 106 is configured to be worn over the eyes or face of a user, such as a test taker. In a certain embodiment, the camera 204 is positioned to capture an image stream that corresponds to, approximates, or is otherwise based on what the user would normally see if the user was not wearing the augmented reality device 106. For example, in the depicted embodiment, the camera 204 is disposed so as to be roughly in front of a user's eyes and facing the same direction as the user when the augmented reality device 106 is worn, to capture images from that direction. The camera 204 may be built in to the augmented reality device 106 or mechanically coupled to the augmented reality device 106 so that the camera 204 moves when the user moves his or her head. Thus, the image stream from a camera 204 facing the same direction as the user from approximately the same position as the user's eyes approximates what the user would see when not wearing the augmented reality device 106.

In certain embodiments, the image stream obtained by the camera 204 corresponds approximately to what the user would see when not wearing the augmented reality device 106. For example, the camera 204 may be positioned slightly forward of the user's eyes, may not have a field of view as wide as the user's peripheral vision, may capture images from a single point of view, or the like. (Alternatively, in one embodiment, two cameras 204 capture a stereoscopic image stream for display to both of the user's eyes separately.) However, an image stream may still correspond to, approximate, or otherwise be based on the user's normal field of view if it includes images of one or more objects that would normally be seen by the user. In some examples, where the user is a test taker, a camera 204 obtains an image stream that includes images of one or more physical items in a space where the user is located, such as the user's desk, test paper, a blackboard or whiteboard on the wall, other people, users, desks, or objects in the space where the user is taking the test, or the like.

The augmented reality device 106, in the depicted embodiment, uses the display 210 to display a modified image stream to a user, such as a test taker. Displaying an image stream, in various embodiments, includes displaying or reproducing a series of images. In some examples, the camera 204 captures images at a frame rate (e.g., 30 frames per second, sixty frames per second, or the like), and the display 210 shows or displays modified images from the camera 204 at the same (or approximately the same) frame rate.

A display 210, in various embodiments, is any device or component capable of displaying an image stream, such as a smartphone screen, a liquid crystal display (LCD) with fluorescent or light-emitting diode (LED) backlighting, an organic light-emitting diode (OLED) display (e.g., an active-matrix OLED (AMOLED) or passive-matrix OLED (PMOLED) display), or the like. In certain embodiments, a display 210 displays a modified image stream using a flat screen, a curved screen that curves horizontally around a user's face and/or curves vertically, a pair of screens individually disposed to be positioned in front of the user's eyes when the augmented reality device 106 is worn, or the like. In further inventions, a display 210 includes one or more lenses for correcting distortions, allowing a user to focus on a screen near the user's eyes, or the like. One of skill in the art will recognize various other or further types of display 210.

In the depicted embodiment, the display 210 is built into the augmented reality device 106. In other embodiments, a display 210 is a separate device coupled to or forming a portion of the augmented reality device 106. In some examples, the camera 204 and display 210 are a camera 204 and display 210 of a user's smartphone, which may be combined with other components to form the augmented reality device 106.

In the depicted embodiment, the augmented reality device 106 is configured to be worn over the eyes or face of a user, such as a test taker. In certain embodiments, the display 210 is positioned to be positioned in front of the user, in the user's field of view, to display an image stream to the user or test taker. For example, in the depicted embodiment, the camera 204 and the display 210 are both positioned so as to be roughly in front of a user's eyes when the augmented reality device 106 is worn, with the camera 204 facing forward in the same direction as the user to capture an image stream corresponding to what the user would normally see when not wearing the augmented reality device 106, and with the display 210 facing backward towards the user to display the image stream, or a modified image stream, to the user. The combination of a forward-facing camera 204 capturing an image stream and a rear-facing display 210 displaying the image stream may allow the augmented reality device 106 to produce the effect, approximately, of the user seeing his or her surroundings normally (as if not wearing the augmented reality device 106), but with modifications, augmentations, or overlay to the normal field of view.

In a certain embodiment, the augmented reality device 106 includes a processor and/or other computing hardware that modifies the image stream obtained by the camera 204 for display by the display 210. In other embodiments, the augmented reality device 106 communicates with another computing device that modifies the image stream. In some examples, the stimulus removal apparatus 150 is operated on or is embodied by the augmented reality device 106 or by a server or other computing device in communication with the augmented reality device 106 to receive an image stream from the camera 204 and send a modified image stream to the display 210.

The face mask 206, in various embodiments, is shaped and/or positioned to limit what a user can see when wearing the augmented reality device 106. In certain embodiments, the face mask 206 is shaped to enclose a region bordered by the user's face at one end, by the display 210 at the other end and by the face mask 206 at the sides, so that the user does not see around or to the side of the display 210 when wearing or using the augmented reality device 106. In some examples, the face mask 206 includes one or more opaque materials, is permanently or detachably coupled to the display 210, and includes one or more flexible materials such as rubber, flexible plastic, foam padding, or the like, to conform to a user's face when the augmented reality device 106 is worn. (An opening or notch to accommodate the user's nose is depicted in dotted lines in FIG. 2.)

In some embodiments, a face mask 206 is formed from flexible material. For example, a face mask 206 may be made from rubber, flexible plastic, or the like. In other embodiments, a face mask 206 includes a portion formed from rigid material, and includes flexible material disposed to couple the rigid portion to the user's face. For example, a face mask 206 may include a portion made from rigid plastic, but may include foam padding disposed to be between the rigid plastic and a user's face. One of skill in the art will recognize various other or further types of face masks 206.

A face mask 206 that conforms or substantially conforms to a user's face when the augmented reality device 106 is worn may prevent the user from seeing information or objects that are not displayed by the display 210. Conforming or substantially conforming to a user's face may eliminate or reduce the size of gaps between the user and the augmented reality device 106, through which the user might see his or her unmodified or un-overlaid surroundings. Thus, modifying the image stream displayed via the display 210 determines or controls what the user sees.

In the depicted embodiment, when the augmented reality device 106 is worn by a user, the stimulus removal apparatus 150 obscures portions of the modified image stream that are outside a permitted field of view, and the face mask 206 prevents the user from directly seeing objects outside the permitted field of view. Thus, in various embodiments, the use of a stimulus removal apparatus 150 with an augmented reality device 106 including a face mask 206 may prevent users from seeing objects that they might use to cheat, such as test papers of other users, a hidden "cheat sheet" or answer key, or the like. In further embodiments, the use of a stimulus removal apparatus 150 with an augmented reality device 106 including a face mask 206 may facilitate focused and undistracted test-taking by obscuring or blocking the user's view of extraneous stimuli or objects that, when viewed, might distract a user's focus away from the test.

The head strap 212, in various embodiments, removably secures the augmented reality device 106 to a user's head, so that the display 210 is positioned in front of the user's eyes, as described above. In various embodiments, the head strap 212 includes one or more elastic bands, adjustable-length fabric bands, or the like, to surround a user's head, holding the face mask 206 against the user's face. In certain embodiments, the head strap 212 includes one or more additional elastic bands, adjustable-length fabric bands, or the like, to go over a user's head, preventing the augmented reality device 106 from slipping down. One of skill in the art will recognize various other or further types of head strap 212, or ways of removably securing the augmented reality device 106 to a user's head other than by using a head strap 212.

In the depicted embodiment, the augmented reality device 106 includes at least one sensor 202. In various embodiments, sensors 202 are configured to determine the position and/or orientation of the augmented reality device 106, or to detect translation and/or rotation of the augmented reality device 106 relative to an initial position and/or orientation. In some embodiments, sensor(s) 202 include a gyroscope and/or an accelerometer. In some embodiments, one or more sensors 202 include one or more accelerometers to detect lateral acceleration of the augmented reality device 106 along one or more axes (e.g., three accelerometers to detect acceleration in the x, y, or z, directions), one or more gyroscopes to detect rotation of the augmented reality device 106, one or more magnetometers to detect an orientation of the augmented reality device 106 relative to the Earth's magnetic field, and/or a Global Positioning System (GPS) receiver to determine the position of the device of the augmented reality device 106. Sensors 202 such as gyroscopes, accelerometers, magnetometers, or the like may include piezoelectric sensors 202, micro electro-mechanical systems (MEMS) sensors 202, Hall effect sensors 202, or the like. One of skill in the art will recognize various other or further types of sensors 202 for determining position and/or orientation of the augmented reality device 106.

In certain embodiments, a stimulus removal apparatus 150 identifies portions of an image stream obtained by the camera 204 as being inside or outside a permitted field of view based on information from at least one sensor 202. In some examples, a permitted field of view includes a user's test, desk, or the like. As the user moves or rotates his or her head, sensors 202 detect the motion of the augmented reality device 106, and the stimulus removal apparatus 150 uses sensor data to determine what parts of the user's current field of view (as obtained by the camera 204) are within or outside the permitted field of view. In some examples, if the user looks left from his or her desk, in the direction of another person's test paper, the sensors 202 detects rotation of the augmented reality device 106, and the stimulus removal apparatus 150 identifies a portion of the image stream to the left as being outside the permitted field of view, and obscures that portion in the modified image stream displayed to the user. One of skill in the art will recognize various ways to use information from at least one sensor 202 to identify a portion of an obtained image stream outside a permitted field of view.

In the depicted embodiment, the augmented reality device 106 includes a removal sensor 208. A removal sensor 208, in various embodiments, is configured to determine and/or indicate whether the user or test taker has removed the augmented reality device 106. Certain test takers may attempt to cheat by removing or partially removing the augmented reality device 106 to view objects or information outside a permitted field of view, such as other test takers' tests or test answers, a hidden cheat sheet or answer key or the like. A removal sensor 208, in certain embodiments, detects whether a user has removed or partially removed the augmented reality device 106. In some examples, the removal sensor 208 outputs a signal monitored by the stimulus removal apparatus 150, has a state such as an open or closed switch position observable by the stimulus removal apparatus 150, or otherwise allows the stimulus removal apparatus 150 to determine whether a user has removed the augmented reality device 106.

In certain embodiments, the removal sensor 208 may be a switch, a sensor, or the like, that responds to pressure against a user's head, proximity to a user's head, or the like. In various embodiments, such a removal sensor 208 is disposed in or is coupled to the face mask 206, the head strap 212, or the like, so that the removal sensor 208 is disposed against, or in close proximity to a user's head when the augmented reality device 106 is worn. In certain embodiments, a removal sensor 208 includes a momentary switch that remains in an "on" or conductive state (or, alternatively, in an "off" or non-conductive state) only when pressure is applied, a capacitive touch sensor, a resistive touch sensor, an optical or electromagnetic proximity sensor, or the like. One of skill in the art will recognize various other or further types of switches, sensors, or the like, suitable for use as a removal sensor 208.

Figure 3:
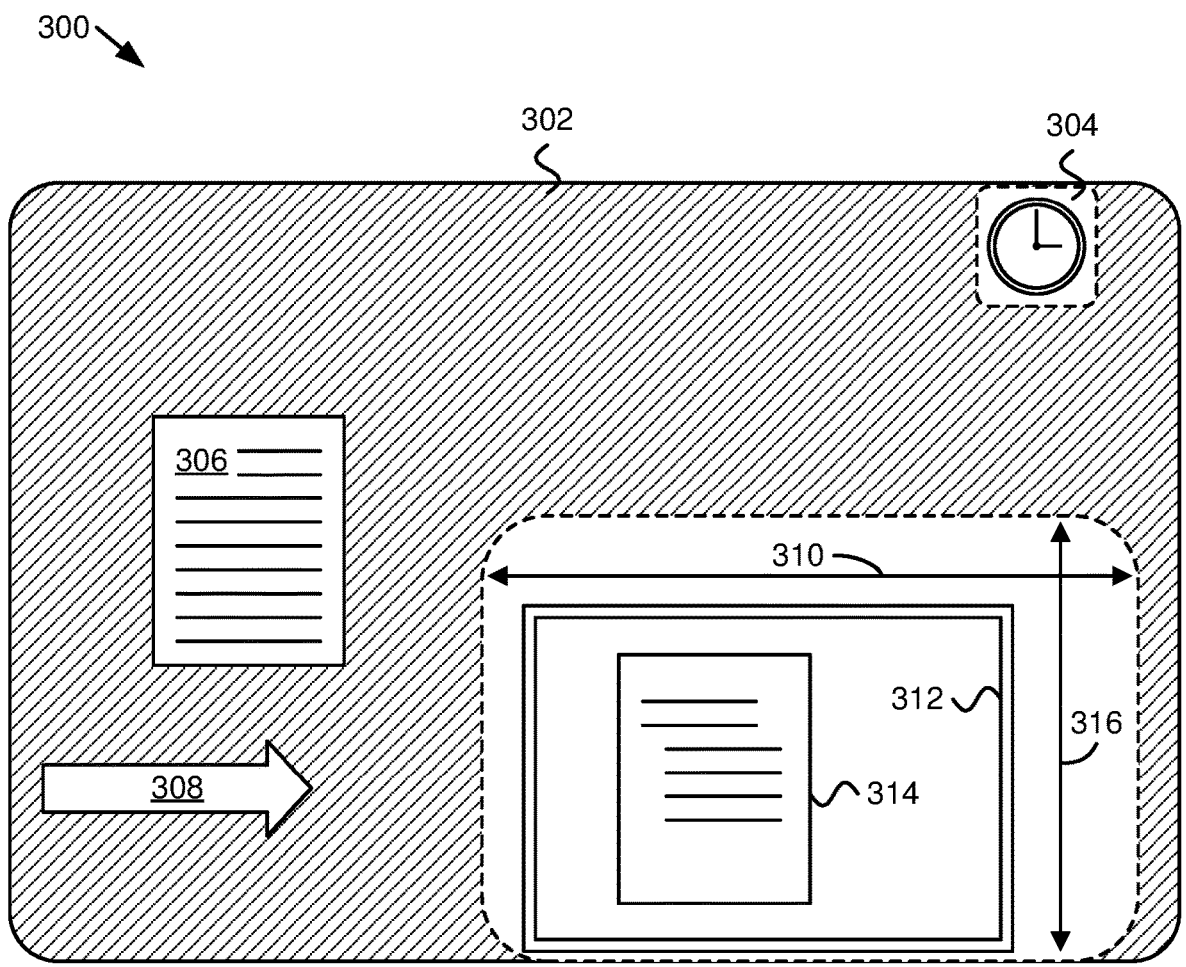
FIG. 3 is a schematic block diagram illustrating one embodiment of a modified image stream, in accordance with one embodiment of the present invention.

FIG. 3 depicts one embodiment of a modified image stream 300. The modified image stream 300, in the depicted embodiment, may be a version of an image stream obtained by an augmented reality device 106 of a user (e.g., via a camera 204) and modified for display to the user via the augmented reality device 106 (e.g., via a display 210), as described above.

In the depicted embodiment, the modified image stream 300 includes a permitted field of view, indicated by dashed lines. In general, in various embodiments, a field of view refers to the extent of what can be "seen" or detected by a person's eyes, a camera 204, or another device that receives light (or electromagnetic radiation inside or outside the visible spectrum) to form images. A field of view may include one or more angular ranges, such as a vertical angle, a horizontal angle, or the like. For example, a field of view in an image obtained by a camera 204 may include a vertical angle, range, or extent from a lower limit of what the camera 204 can "see" or capture to an upper limit of what the camera 204 can "see" or capture, and may include a horizontal angle, range, or extent from a leftmost limit of what the camera 204 can "see" or capture to a rightmost limit of what the camera 204 can "see" or capture.

In further embodiments, a permitted field of view may be a portion of a field of view that a stimulus removal apparatus 150 has determined that a user is permitted to see. In various embodiments, the stimulus removal apparatus 150 obscures portions of an image stream outside a permitted field of view, but displays a portion of the image stream within the permitted field of view to the user.

In some embodiments, a permitted field of view is based on a permitted horizontal orientation range 310 and/or a permitted vertical orientation range 316. An orientation range, in various embodiments, is a range or extent of angles or other measurements or indications of orientations. In further embodiments, a permitted horizontal orientation range 310 or a permitted vertical orientation range 316 includes ranges or extents of horizontal or vertical angles, respectively, through which a user is allowed to see. In some examples, a permitted range of 30 horizontal degrees is sufficient to permit a user to see his or her own test 314 without viewing tests of people on either side, and a permitted horizontal orientation range 310 may be a range from −15° to +15°, where 0° is a forward orientation facing a user's desk. In other examples, a permitted range of 45 vertical degrees is sufficient to permit a user to see his or her own test 314, and a permitted vertical orientation range 316 is a range from 30° below horizontal to 75° below horizontal, allowing a user to see his or her own test 314, without viewing tests of people further forward in the room, and without viewing a "cheat sheet," phone or other information that may be concealed in the user's lap.

The examples of a permitted horizontal orientation range 310 and a permitted vertical orientation range 316 described herein are provided for illustrative purposes and are not intended as limiting. In other embodiments, a permitted field of view is based on another permitted horizontal orientation range 310 and/or another permitted vertical orientation range 316.

In some embodiments, a permitted field of view includes a permitted horizontal orientation range 310 so that the permitted field of view is limited horizontally but is unrestricted vertically. In other embodiments, a permitted field of view includes a permitted vertical orientation range 316 so that the permitted field of view is limited vertically but is unrestricted horizontally. For example, if a test is "open book" or "open note," so that information the user needs can be placed in plain view, a proctor may not be concerned with limiting vertical views into users' own laps, but may be concerned with limiting horizontal views toward other people's tests. Conversely, if different tests are distributed to different people in the room, a proctor may not be concerned with limiting horizontal views toward other tests, but may be concerned with limiting vertical views toward concealed information.

In certain embodiments, obscuring portions of an image stream outside a permitted field of view may still allow a user to move so that forbidden items are inside the permitted field of view. For example, if a permitted horizontal orientation range 310 is from −15° to +15°, where 0° is a forward orientation facing a user's desk, a user may be able to see another test to the side of them by getting up and moving to the side (rather than rotating in the direction of the other test), or by moving backwards so that a larger area is within the permitted 30° wedge. However, in certain embodiments, such large-scale movements may be more easily noticed by a proctor than small glances to the side would be.

In some embodiments, a permitted field of view is based on or includes one or more permitted items. Permitted items may be physical items such as papers, blackboards, desks, or other items in a space where the user is located, such as a room where a test is administered. For example, in the depicted embodiment, the permitted field of view indicated by dashed lines includes two disjoint sub-fields of view, including views of the user's own test 314, and of a clock 304. Permitted fields or sub-fields of view may, in various embodiments, include various items such as test papers, formula sheets with permitted information, formulas or other permitted information on a blackboard, whiteboard, poster, map, or the like. In further embodiments, a permitted field of view is narrow, so as to only include the permitted items, or includes a margin around the permitted item. In some embodiments, a stimulus removal apparatus 150 uses object recognition software to recognize permitted items and associated fields of view. In other embodiments, a stimulus removal apparatus 150 is configured with one or more permitted horizontal orientation ranges 310 and/or permitted vertical orientation ranges 316, based on where permitted items are expected to be.

In some embodiments, a permitted field of view is based on an orientation of the user at a certain time. In some examples, a user is prompted by a stimulus removal apparatus 150 or by a proctor to look in the general direction of his or her own test 314 at a particular time before the test starts, and the permitted field of view is "locked in" to the user's field of view at that time. In other embodiments, a stimulus removal apparatus 150 displays a boundary, via an augmented reality device 106, corresponding to the edges of where a permitted field of view will be, and the user is instructed to center their own test 314 within the displayed boundary, before the permitted field of view is locked in. Basing a permitted field of view on an orientation of the user at a certain time may allow a user to face another person's test at the relevant time to include a view of that person's test in the permitted field of view, but at the expense of not being able to easily see or use the user's own test 314.

In some embodiments, a permitted field of view is based on at least one boundary definition marker 312. A boundary definition marker 312 may be any object that defines boundaries for a permitted field of view. In some examples, where multiple test takers share a common table rather than individual desks, a permitted field of view for one user is defined by boundary definition markers 312 such as bright, dark, or colored items (e.g., adhesive dots) marking corners of the permitted field of view, bright, dark or colored ribbons or tape marking edges of the permitted field of view, or the like. For example, in the depicted embodiment, tape at the boundary of the test-taker's desk acts as a boundary definition marker 312. One of skill in the art will recognize various other or further types of boundary definition marker 312.

In some embodiments, information in a permitted field of view is based on field definition information from a proctor. In other embodiments, field definition information includes any information that defines the permitted field of view, and is obtained from a proctor via the proctor interface 110, a proctor computing device 102, or the like. In some examples, a proctor provides a permitted horizontal orientation range 310 and/or a permitted vertical orientation range 316 via a proctor interface 110, as field definition information. Field definition information may include ranges of permitted orientations, central orientations plus a permitted margin on either side of a permitted orientation, a definition or image of a permitted item, or the like. One of skill in the art will recognize various ways to define a permitted field of view, and types of field definition information.

In the depicted embodiment, the modified image stream 300 includes a portion 302 outside the permitted field of view, which is obscured by the stimulus removal apparatus 150. The obscured portion 302 of the modified image stream 300 is depicted as obscured by diagonal lines. In various embodiments, a portion 302 of the modified image stream 300 outside the permitted field of view is obscured by replacing that portion 302 with a solid color, a still image, a transformed (e.g., blurred or distorted) version of the originally obtained image stream, or the like.

In the depicted embodiment, the modified image stream 300 further includes permitted information 306. Permitted information 306 may be information that is electronically transmitted to the augmented reality device 106, and may exclude information or items that are physically visible in the space where the user is located. For example, permitted information 306 may be an image of a formula sheet provided by a proctor, an image of a note sheet uploaded by the user (and, possibly, approved by the proctor), or the like. One of skill in the art will recognize various other or further types of permitted information 306 that may be displayed in a modified image stream 300.

In some embodiments, permitted information 306 includes at least one customized test question. For example, to avoid cheating, a test taker's own test 314 may be identical to other tests on paper, but may include space to answer questions not displayed on the test 314, where the additional questions are customized so that different test takers see different questions. The customized question(s) for a test taker, in some embodiments, are displayed as part of the permitted information 306 for the test taker, or in a similar manner as the permitted information 306. In some examples, the modified image stream 300 includes permitted information 306 to one side of the permitted field of view, and includes one or more customized test questions to the other side of the permitted field of view.

In certain embodiments, the modified image stream 300 includes an indicator 308 that indicates a direction to the permitted field of view. In various embodiments, a test taker may become disoriented if he or she is not facing the permitted field of view, or if it is not clear what direction to turn to face the permitted field of view. An indicator 308, in some embodiments, includes any information indicating a direction towards the permitted field of view, such as an arrow, a brightness gradient, a color gradient, a written instruction to turn left or right, or the like. In the depicted embodiment, the indicator 308 is an arrow displayed in the modified image stream 300. One of skill in the art will recognize various other or further types of indicators 308 for indicating a direction to the permitted field of view.

Figure 4:
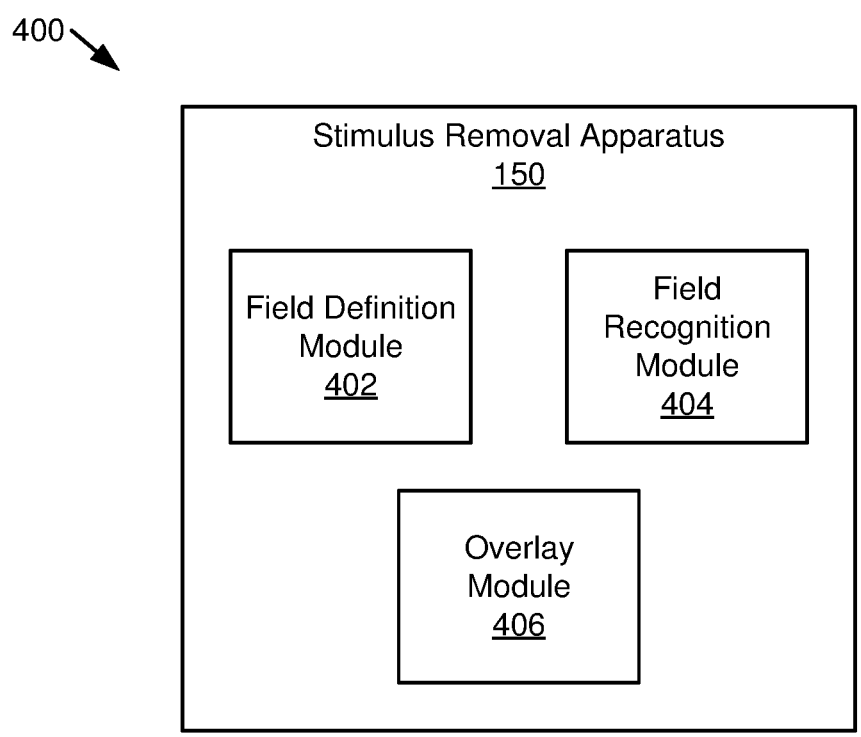
FIG. 4 is a schematic block diagram illustrating one embodiment of an apparatus for augmented reality stimulus removal, in accordance with one embodiment of the present invention.

FIG. 4 depicts one embodiment of an apparatus 400 for augmented reality stimulus removal. The apparatus 400, in the depicted embodiment, includes one embodiment of the stimulus removal apparatus 150 with a field definition module 402, a field recognition module 404, and an overlay module 406, which are described below.

In the depicted embodiment, the stimulus removal apparatus 150 includes a field definition module 402 that determines a permitted field of view for a user. As described above, a user may be any user of an augmented reality device 106, and may be a person taking a test or a person who wishes to remove or obscure external stimuli for reasons other than test-taking. Also, as described above, a field of view may be a range or extent of what can be seen or detected by the user's eyes (e.g., when not wearing an augmented reality device 106) or by a camera 204 of an augmented reality device 106, and a permitted field of view may be a portion of the available field of view that a user is permitted to see. In some examples, a permitted field of view includes a view of the user's own test or desk, but does not include other tests being taken by other people in the same room.

In various embodiments, as described above, a permitted field of view may be based on a permitted horizontal orientation range 310, a permitted vertical orientation range 316, one or more permitted items that are physical items in the space where the user is located (e.g., the test 314 and the clock 304 of FIG. 3), one or more boundary definition markers 312, and/or on field definition information from a proctor. In further embodiments, determining a permitted field of view includes determining boundaries of a permitted field of view, determining an extent of a permitted field of view, determining what is outside the permitted field of view, or the like. In certain embodiments, the field definition module 402 determines the permitted field of view by receiving field definition information from a proctor (e.g., via the proctor interface 110), by using object recognition software to detect boundary definition markers 312 or permitted items in the image stream obtained by the augmented reality device 106, and/or by communicating with sensors 202 to determine the user's orientation at a particular time when the field of view is "locked in." One of skill in the art will recognize various other or further ways for a field definition module 402 to determine, define, or identify a permitted field of view.

In the depicted embodiment, the stimulus removal apparatus 150 includes a field recognition module 404 that identifies a portion of an image stream obtained by a user's augmented reality device 106 as being outside the permitted field of view. In various embodiments, as described above, an image stream obtained by a user's augmented reality device 106 includes a series of images obtained by one or more cameras 204. Images of an image stream may be captured periodically or at intervals (e.g., at a video frame rate) and may be encoded or transmitted in a raw format, a compressed image format, a compressed video format or the like.

In certain embodiments, portions of an image stream are within or outside a permitted field of view. In various embodiments, a portion of an image stream or of an image (e.g., within an image stream) is within a permitted field of view if it depicts what could be seen by a person or device limited to the permitted field of view, and is outside the permitted field of view if it depicts what could not be seen by a person or device limited to the permitted field of view. In some examples, if the permitted field of view is defined by a permitted horizontal orientation range 310 from −20° to +20°, where 0° is a forward orientation facing a user's desk, then a portion of an image depicting what is within the permitted 40° wedge, such as the user's own test or desk, is within the permitted field of view, but another portion of an image depicting what is outside the permitted 40° wedge is outside the permitted field of view.

In some embodiments, an image obtained by a user's augmented reality device 106 for a forward-facing user includes a central portion within the permitted field of view, depicting the user's desk and test, and includes side portions outside the permitted field of view (e.g., depicting the sides of the room, other users' desks, or the like). In further embodiments, if the user turns to the left, so that the user's desk and test are now to his or her right, an image obtained by the user's augmented reality device 106 includes a right side portion within the permitted field of view, depicting the user's desk and test, and a left side portion outside the permitted field of view.

In some embodiments, a portion of an image or image stream outside a permitted field of view is a continuous region within the image, or a set of disjoint regions within the image. For example, a portion of an image outside a permitted field of view includes a continuous region around the permitted field of view, or includes disconnected left and right sides of the image, disconnected top and bottom portions of the image, or the like.

In further embodiments, portions of an image stream that are within or outside a permitted field of view are portions of individual images in the image stream that are respectively within or outside the permitted field of view. In some examples, as a user turns away from the permitted field of view, individual images within the stream include increasingly larger portions outside the permitted field of view and smaller portions within the permitted field of view. The portion of the image stream that is outside the field of view may be the set of (increasingly large) portions of images that are outside the permitted field of view.

The field recognition module 404, in various embodiments, identifies the portion of the obtained image stream that is outside the permitted field of view in various ways. In certain embodiments, the field recognition module 404 communicates with the user's augmented reality device 106 to obtain position and/or orientation information for the augmented reality device 106, and identifies portions of the obtained image stream as being within or outside the permitted field of view based on the obtained position and/or orientation information. In further embodiments, the field recognition module 404 identifies a portion of the image stream outside the permitted field of view based on information from at least one sensor 202 of the augmented reality device 106.

For example, as described above, one or more sensors 202 may include one or more gyroscopes, and/or one or more accelerometers, and the field recognition module 404 may use information from the sensors 202 to determine the orientation of the augmented reality device 106 (e.g., relative to a permitted horizontal orientation range 310 and/or a permitted vertical orientation range 316), and thereby identify which portions of the image stream are within or outside the permitted field of view. In further embodiments, the field recognition module 404 uses information from other or further sensors 202 such as a magnetometer, a GPS receiver or the like, to identify which portions of the image stream are within or outside the permitted field of view. One of skill in the art will recognize various other or further ways for a field recognition module 404 to identify which portions of an image stream are within or outside a permitted field of view.

In the depicted embodiment, the stimulus removal apparatus 150 includes an overlay module 406 that modifies the image stream for display to the user via the augmented reality device 106, by obscuring the portion of the image stream outside the permitted field of view in response to a restrictive mode being set for the user. In certain embodiments, the modified image stream are substantially as described above with reference to the modified image stream 300 of FIG. 3. In various embodiments, modifying an obtained image stream or producing a modified image stream includes changing the originally obtained image stream in any way, such as by modifying, changing, or editing images within the image stream. The overlay module 406, in various embodiments, includes image or video processing software (e.g., code stored on a computer-readable medium, a processor executing code, or the like) and/or hardware that receives the image stream, changes one or images within the image stream, and outputs the modified image stream.

In further embodiments, the modified image stream produced or output by the overlay module 406 are displayed to the user by the augmented reality device 106. In some examples, the overlay module 406 outputs the modified image stream to the display 210 of the user's augmented reality device 106.

The overlay module 406, in certain embodiments, modifies the obtained image stream by obscuring the portion of the obtained image stream identified by the field recognition module 404 as being outside the permitted field of view determined by the field definition module 402. Obscuring the identified portion of the image stream, in various embodiments, includes modifying the identified portion in any way that removes, conceals, or obfuscates information in the identified portion, or that otherwise keeps objects, items, text, and/or other information depicted in the identified portion from being seen or clearly perceived.

In some examples, the overlay module 406 obscures the portion of the image stream outside the permitted field of view by replacing that portion with a solid color such as a uniform gray background, a still image such as a photograph or a repeating pattern (e.g., stripes, checks, a wallpaper pattern, or the like), and/or a transformed view of that portion. A transformed view of a portion of an image or image stream may be a modification of the portion that is based on the original content of the portion in some way, but that is changed (e.g., by applying a transformation function) to obscure what is depicted. In some examples, the overlay module 406 replaces a portion of the image stream outside the permitted field of view with a transformed view that is a blurred or distorted version of the same portion in the obtained image stream. In some embodiments, obscuring a portion of the image stream outside the permitted field of view by a transformed view that blurs or distorts the original portion, overlays a semi-opaque layer, or the like, may permit students to generally perceive large-scale objects such as desks or people, but not to perceive small-scale information such as another person's test answers.

In certain embodiments, the overlay module 406 obscures a portion of the obtained image stream outside the permitted field of view in response to a restrictive mode being set for the user. A mode, in various embodiments, is a state or condition of the stimulus removal apparatus 150, such as a general state, a state that is set on a per-user basis, or the like. In further embodiments, a restrictive mode is a state or condition indicating that a portion of the obtained image stream outside a permitted field of view is to be obscured in a modified image stream displayed to the user. In some examples, a restrictive mode may indicate that a test is in progress, or that external stimuli are to be removed or obscured for reasons other than a test.

In certain embodiments, a restrictive mode is set for a user by changing a general state or state indicator (e.g., a value in memory, storage, or the like) for a stimulus removal apparatus 150 (thus possibly setting the restrictive mode for multiple users) and/or by changing a more specific state or state indicator that a stimulus removal apparatus 150 maintains corresponding to the user. In some embodiments, as described below with respect to FIG. 5, a proctor operates the proctor interface 110 to set or unset a restrictive mode for one or more users. In other embodiments, a stimulus removal apparatus 150 is configured to automatically set and unset a restrictive mode at predetermined times for starting and ending a test. One of skill in the art will recognize various other or further ways of setting or unsetting a restrictive mode for a user.

In certain embodiments, the overlay module 406 responds to the restrictive mode being set or unset. In some examples, the overlay module 406 displays an unmodified image stream or a partially modified image stream (e.g., with informational overlays) to the user prior to the restrictive mode being set, or after the restrictive mode is unset, but obscures the portion of the obtained image stream outside the permitted field of view in response to the restrictive mode being set, or while the restrictive mode is set.

In further embodiments, the overlay module 406 outputs a full-view mode image stream for display to the user via the augmented reality device 106 in response to a full-view mode being set for the user. In some embodiments, a full-view mode is the inverse of a restrictive mode, so that the full-view mode is set when the restrictive mode is unset. In other embodiments, the full-view mode is one mode of a plurality of modes that may be set (e.g., by a proctor via the proctor interface 110) when the restrictive mode is unset.

A full-view mode image stream, in various embodiments, is an unmodified version of the originally obtained image stream, or is a modified version in which information is added, such as a boundary line showing a boundary between portions of the image stream that will or will not be obscured when the restrictive mode is set. However, in various embodiments, the portion of the image stream outside the permitted field of view may be unobscured in the full-view mode. A portion of the image stream may be referred to as unobscured if information depicted in that portion, such an image of another person's desk, is viewable or at least partially viewable by the user. In some examples, informational overlays in the full-view mode image stream, such as a clock, a formula sheet, or the like, cover a portion of the obtained image stream, but that portion may still be viewable if the user shifts position or orientation.

In certain embodiments, the full-view mode is set before and/or after a test is in progress, so that the overlay module 406 permits a user to see information in the full-view image stream before or after the test, while putting on the augmented reality device 106, or the like. In further embodiments, the restrictive mode is set at the beginning of a test and may remain set for the duration of the test, so that the overlay module 406 prevents cheating, removes extraneous stimuli, or the like by obscuring a portion of the image stream.

In some embodiments, the overlay module 406 further modifies the image stream to display permitted information to the user. Permitted information is substantially as described above with regard to the permitted information 306 of FIG. 3, and is information that is electronically transmitted to the augmented reality device 106, excluding information or items that are physically visible in the space where the user is located. In some examples, permitted information includes a current time, an elapsed time for a test, a remaining time for a test, a percentage of elapsed time relative to total time for a test, a formula sheet provided by a proctor, a note sheet uploaded by the user and approved by the proctor, or the like.

In certain embodiments, the overlay module 406 displays permitted information by overlaying it in the modified image stream. In some examples, the overlay module 406 replaces the portion outside the permitted field of view with a solid color, a pattern, or the like, and replaces or overlays a region of the color or pattern with an image of the permitted information. In other embodiments, the overlay module 406 overlays permitted information at a particular location in the display 210. In some examples, the overlay module 406 displays a small timer at the top of the display 210, in the center, regardless of whether that portion of the image stream is currently within or outside the permitted field of view. One of skill in the art will recognize various other or further ways for an overlay module 406 to display permitted information.

In some embodiments, where the user is a test taker, the overlay module 406 further modifies the image stream to display at least one customized test question to the test taker. A customized test question, in various embodiments, is a question that is modified or individualized for a particular test taker, and differs from a similar customized test question for another test taker. As described above, in some embodiments, a customized test question is not be displayed on the test taker's own test, but is displayed electronically by the overlay module 406 in the modified image stream. An overlay module 406, in some embodiments, displays a customized test question as an overlay in the modified image stream, in a similar manner to the permitted information described above.

The overlay module 406, in certain embodiments, further modifies the image stream to indicate, over the obscured portion of the image stream outside the permitted field of view, a direction to the permitted field of view. In certain embodiments, indicating a direction to the permitted field of view includes displaying an indicator as an overlay in the modified image stream, in a similar manner to the permitted information described above. In various embodiments, an indicator is substantially as described above with regard to the indicator 308 of FIG. 3, and includes information indicating a direction towards the permitted field of view, such as an arrow, a brightness gradient, a color gradient, a written instruction to turn left or right, or the like.

Figure 5:
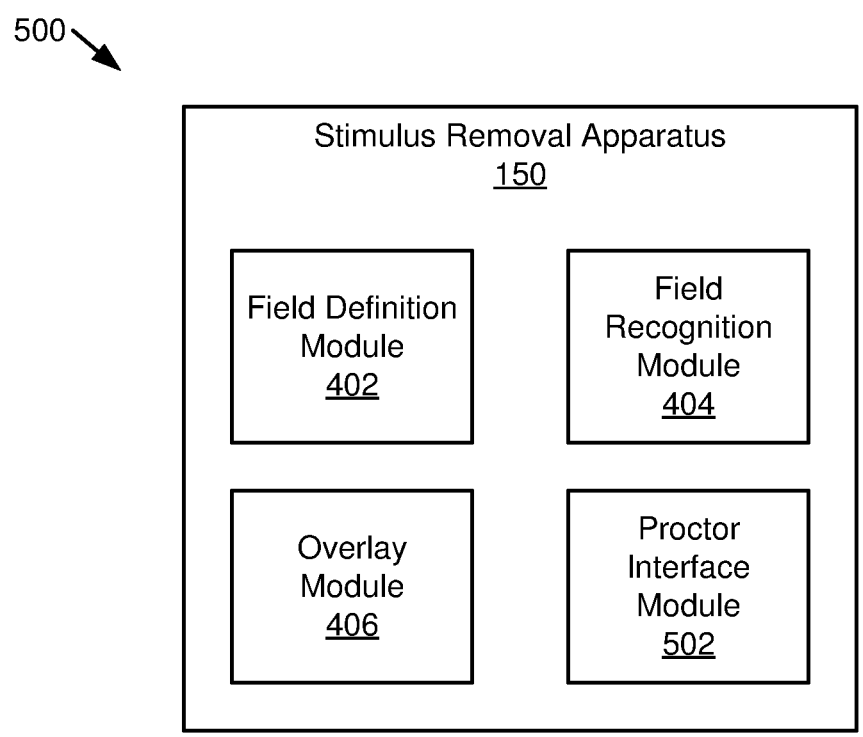
FIG. 5 is a schematic block diagram illustrating another embodiment of an apparatus for augmented reality stimulus removal, in accordance with one embodiment of the present invention.

FIG. 5 depicts another embodiment of an apparatus 500 for augmented reality stimulus removal. In the depicted embodiment, the apparatus 500 includes an embodiment of the stimulus removal apparatus 150, including a field definition module 402, a field recognition module 404, and an overlay module 406, which is substantially similar to the embodiments described above with reference to the apparatus 400 of FIG. 4. In the depicted embodiment, the stimulus removal apparatus 150 includes a proctor interface module 502, which is described below.

In the depicted embodiment, the stimulus removal apparatus 150 includes a proctor interface module 502 that communicates with a proctor via a proctor interface 110, as described above. In one embodiment, the proctor interface module 502 sets and unsets the restrictive mode based on the proctor operating the interface. In some examples, the proctor interface 110 includes a control such as a switch, check box, button or the like that can be moved, checked, pressed or otherwise operated by the proctor. The proctor interface module 502, in some embodiments, communicates with the proctor interface 110 to receive the state of the control, periodically poll the state of the control, or the like, and sets and/or unsets the restrictive mode based on the state of the control.

In certain embodiments, the proctor interface module 502 sets or unsets a restrictive mode for multiple test takers generally based on a general control provided by the proctor interface 110. In some embodiments, the proctor interface module 502 sets or unsets a restrictive mode for a user individually based on one or more individual controls provided by the proctor interface 110. In a further embodiment, the proctor interface module 502 provides both general-level and individual-level control (e.g., as an exception to the general state) of a restrictive mode. In certain embodiments, general-level control of a restrictive mode facilitates starting a test for a room full of test-takers, and individual-level control facilitates pausing the test for an individual user to take a restroom break, to adjust a permitted field of view for the user, or the like.

In one embodiment, the proctor interface module 502 presents an alert to the proctor in response to determining, based on a removal sensor 208 for a user's augmented reality device 106, that the user has removed the augmented reality device 106. As described above with regard to FIG. 2, a removal sensor 208, in some embodiments, includes a switch, a touch sensor, a proximity sensor, or the like, for determining whether a user has removed the augmented reality device 106. The proctor interface module 502, in some embodiments, receives information from the removal sensor 208, periodically poll the removal sensor 208, or the like, and presents an alert if the user has removed the augmented reality device 106.

An alert, in various embodiments, includes any communication that indicates to the proctor that the user has removed the augmented reality device 106. In some examples, an alert includes an audible alarm, a text message sent to the proctor, a message presented via the proctor interface 110, a chart showing which user has removed the augmented reality device 106, or the like. In further embodiments, the proctor interface module 502 presents an alert to the proctor in various ways, such as by sounding an alarm, displaying a message via the proctor interface 110, or the like. One of skill in the art will recognize various other or further types of alerts and ways to present alerts to a proctor. In certain embodiments, presenting a removal alert to a proctor allows the proctor to determine if a user is attempting to remove or see around the augmented reality device 106 to view unauthorized information, or if the user is experiencing a problem with the augmented reality device 106, or has finished the test.

Figure 6:
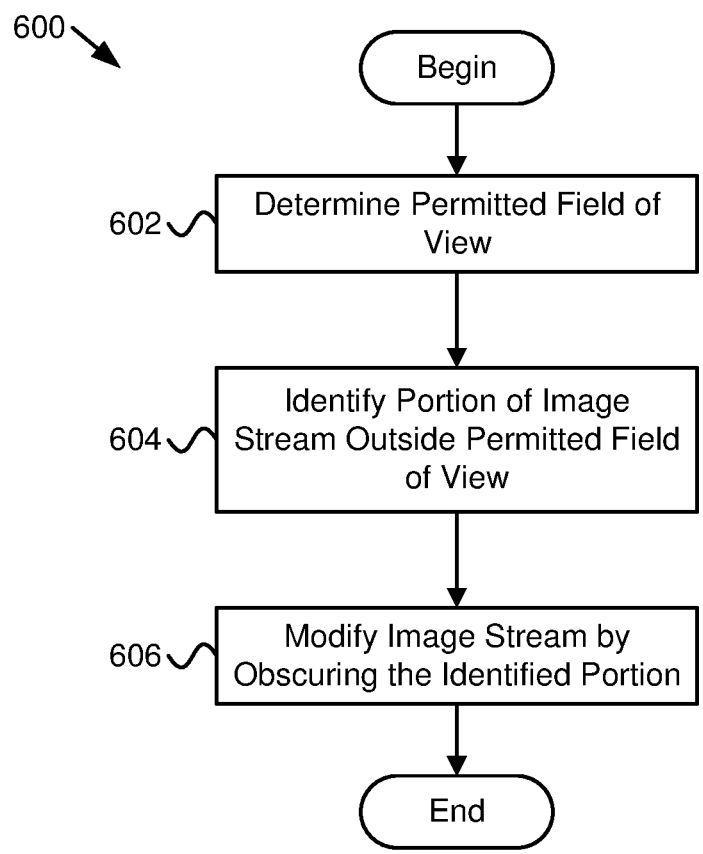
FIG. 6 is a schematic flow chart diagram illustrating one embodiment of a method for augmented reality stimulus removal, in accordance with one embodiment of the present invention.

FIG. 6 is a schematic flow chart diagram illustrating one embodiment of a method 600 for augmented reality stimulus removal. The method 600 begins, and determines 602 a permitted field of view for a user. In one embodiment, the field definition module 402 determines 602 the permitted field of view. The method 600 identifies 604 a portion of an image stream outside the permitted field of view. In one embodiment, the image stream is obtained by an augmented reality device 106 of the user. In a certain embodiment, the field recognition module 404 identifies 604 the portion of the image stream outside the permitted field of view. The method 600 modifies 606 the image stream for display to the user via the augmented reality device 106, by obscuring the portion of the image stream outside the permitted field of view in response to a restrictive mode being set for the user, and the method 600 ends. In one embodiment, the overlay module 406 modifies 606 the image stream.

Figure 7:
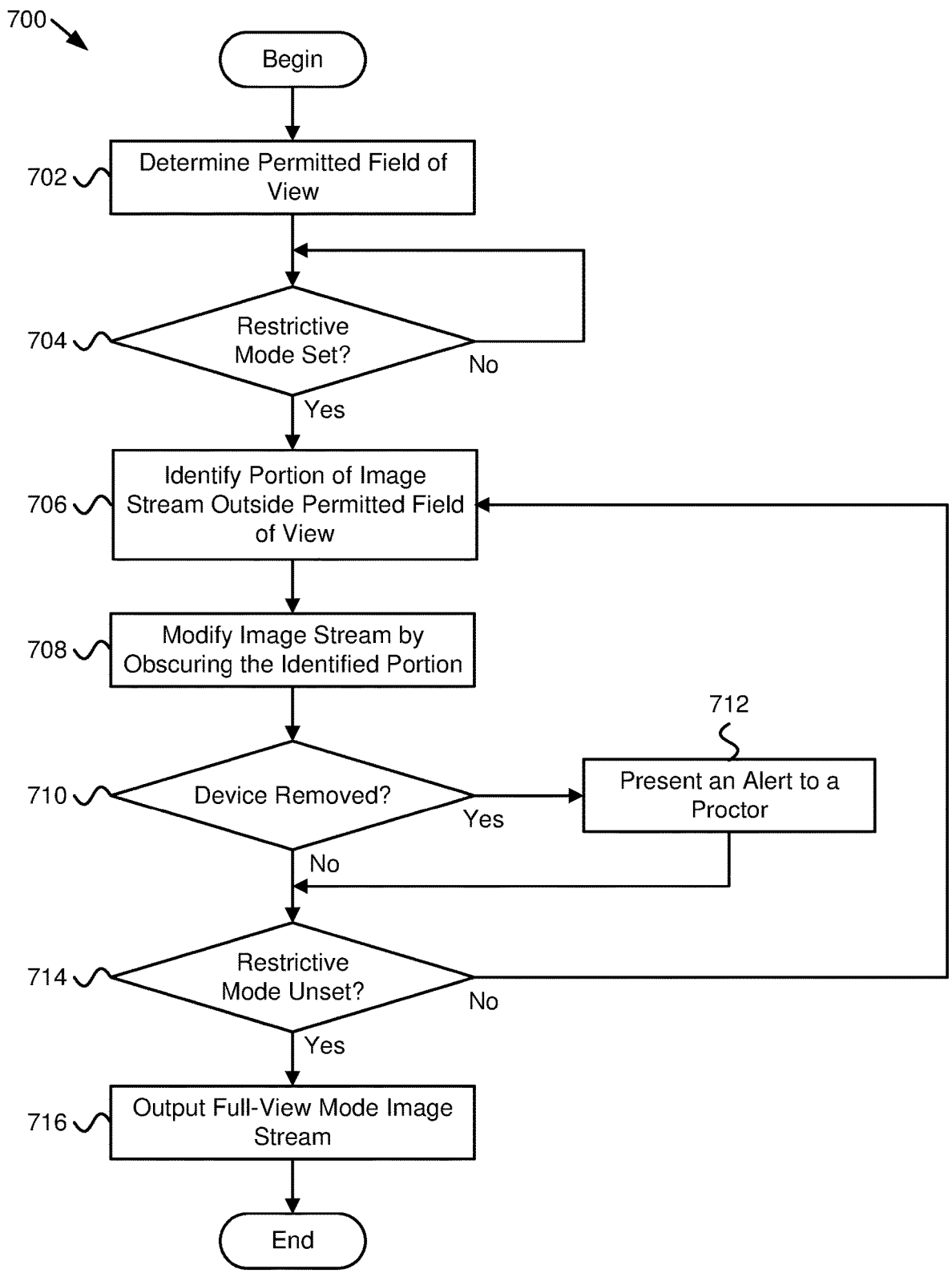
FIG. 7 is a schematic flow chart diagram illustrating another embodiment of a method for augmented reality stimulus removal, in accordance with one embodiment of the present invention.

FIG. 7 is a schematic flow chart diagram illustrating another embodiment of a method 700 for augmented reality. The method 700 begins, and determines 702 a permitted field of view for a user. In one embodiment, the field definition module 402 determines 702 the permitted field of view. The method 700 determines 704 whether a restrictive mode has been set for the user. In one embodiment, the overlay module 406 determines 704 whether the restrictive mode has been set. The method 700 may repeat determining 704 whether the restrictive mode has been set, until the restrictive mode has been set.

Once the restrictive mode has been set, the method 700 continues, and identifies 706 a portion of an image stream outside the permitted field of view. In one embodiment, the image stream is obtained by an augmented reality device 106 of the user. In a certain embodiment, the field recognition module 404 identifies 706 the portion of the image stream outside the permitted field of view. The method 700 modifies 708 the image stream for display to the user via the augmented reality device 106, by obscuring the portion of the image stream outside the permitted field of view. In one embodiment, the overlay module 406 modifies 708 the image stream.

While the restrictive mode is set, the method 700 determines 710 whether the user has removed the augmented reality device 106. In one embodiment, the proctor interface module 502 determines 710, based on the removal sensor 208, whether the user has removed the augmented reality device 106. If the user has removed the augmented reality device 106, the method 700 presents 712 an alert to a proctor. In one embodiment, the proctor interface module 502 presents 712 the alert.

The method 700 continues, and determines 714 whether the restrictive mode has been unset. In one embodiment, the overlay module 406 determines 714 whether the restrictive mode has been unset. If the restrictive mode has not been unset, the method 700 continues to identify 706 a portion of an image stream outside the permitted field of view, modify 708 the image stream by obscuring the portion of the image stream outside the permitted field of view, and so on. If the restrictive mode has been unset, the method 700 outputs 716 a full-view mode image stream for display to the user via the augmented reality device 106, and the method 700 ends. In a certain embodiment, the portion of the image stream outside the permitted field of view is unobscured in the full-view mode. In one embodiment, the overlay module 406 outputs 716 the full-view mode image stream.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a field definition module that assigns a permitted field of view for a user wearing an augmented reality device, wherein a camera of the augmented reality device captures, in an image stream, a field of view of the user, the field of view comprising physical surroundings of the user, the permitted field of view comprising a portion of the field of view of the user;
   a field recognition module that identifies a portion of the image stream outside the permitted field of view; and
   an overlay module that modifies the image stream for display to the user via the augmented reality device, by obscuring the portion of the image stream outside the permitted field of view in response to a restrictive mode being set for the user,
   wherein at least a portion of said modules comprise one or more of hardware circuits, programmable hardware devices and executable code, the executable code stored on one or more computer readable storage media.

2. The apparatus of claim 1, further comprising a proctor interface module that communicates with a proctor via an interface, and sets and unsets the restrictive mode based on the proctor operating the interface.

3. The apparatus of claim 2, wherein the proctor interface module presents an alert to the proctor in response to determining, based on a removal sensor for the augmented reality device, that the user has removed the augmented reality device.

4. The apparatus of claim 1, wherein the permitted field of view is based on one or more of:
   a permitted horizontal orientation range; and
   a permitted vertical orientation range.

5. The apparatus of claim 1, wherein the permitted field of view is based on one or more of:
   one or more permitted items comprising one or more physical items in a space where the user is located;
   an orientation of the user at a particular time;
   at least one boundary definition marker; and
   field definition information from a proctor.

6. The apparatus of claim 1, wherein the field recognition module identifies the portion of the image stream outside the permitted field of view based on information from at least one sensor of the augmented reality device.

7. The apparatus of claim 6, wherein the at least one sensor comprises one or more of a gyroscope and an accelerometer.

8. The apparatus of claim 1, wherein the overlay module obscures the portion of the image stream outside the permitted field of view by replacing the portion with one or more of a solid color, a still image, and a transformed view of the portion.

9. The apparatus of claim 1, wherein the overlay module further modifies the image stream to display permitted information to the user, the permitted information electronically transmitted to the augmented reality device, the permitted information excluding items visible in a space where the user is located.

10. The apparatus of claim 1, wherein the user is a test taker and the overlay module further modifies the image stream to display at least one customized test question to the test taker.

11. The apparatus of claim 1, wherein the overlay module further modifies the image stream to indicate, over the obscured portion of the image stream outside the permitted field of view, a direction to the permitted field of view.

12. The apparatus of claim 1, wherein the overlay module outputs a full-view mode image stream for display to the user via the augmented reality device in response to a full-view mode being set for the user, wherein the portion of the image stream outside the permitted field of view is unobscured in the full-view mode.

13. A system comprising:
an augmented reality device for a user, wherein the augmented reality device obtains an image stream of a field of view of the user and displays a modified image stream to the user, wherein the field of view of the user comprises physical surroundings of the user;
a field definition module that assigns a permitted field of view for the user, the permitted field of view comprising a portion of the field of view of the user;
a field recognition module that identifies a portion of the obtained image stream outside the permitted field of view; and
an overlay module that produces the modified image stream by obscuring the portion of the obtained image stream outside the permitted field of view in response to a restrictive mode being set for the user,
wherein at least a portion of said modules comprise one or more of hardware circuits, programmable hardware devices and executable code, the executable code stored on one or more computer readable storage media.

14. The system of claim 13, further comprising
a computing device that presents an interface to a proctor; and
a proctor interface module that communicates with the proctor via the interface, and sets and unsets the restrictive mode based on the proctor operating the interface.

15. The system of claim 14, wherein the augmented reality device comprises a removal sensor, and the proctor interface module presents an alert to the proctor in response to determining, based on the removal sensor, that the user has removed the augmented reality device.

16. The system of claim 13, wherein:
the augmented reality device comprises at least one sensor, the at least one sensor comprising one or more of a gyroscope and an accelerometer; and
the field recognition module identifies the portion of the obtained image stream outside the permitted field of view based on information from the at least one sensor.

17. A computer-implemented method for augmented reality stimulus removal comprising:
assigning a permitted field of view for a user wearing an augmented reality device, wherein a camera of the augmented reality device captures, in an image stream, a field of view of the user, the field of view comprising physical surroundings of the user, the permitted field of view comprising a portion of the field of view of the user;
identifying a portion of an image stream outside the permitted field of view; and
modifying the image stream for display to the user via the augmented reality device, by obscuring the portion of the image stream outside the permitted field of view in response to a restrictive mode being set for the user.

18. The computer-implemented method of claim 17, further comprising communicating with a proctor via an interface, to set and unset the restrictive mode based on the proctor operating the interface.

19. The computer-implemented method of claim 17, further comprising presenting an alert to a proctor in response to determining, based on a removal sensor for the augmented reality device, that the user has removed the augmented reality device.

20. The computer-implemented method of claim 17, wherein obscuring the portion of the image stream outside the permitted field of view comprises replacing the portion with one or more of a solid color, a still image, and a transformed view of the portion.

\* \* \* \* \*